US012283666B2

(12) United States Patent
Oh et al.

(10) Patent No.: US 12,283,666 B2
(45) Date of Patent: Apr. 22, 2025

(54) COMPOSITE CATALYST FOR POSITIVE ELECTRODE OF AQUEOUS RECHARGEABLE BATTERY, METHOD FOR PREPARING THE COMPOSITE CATALYST, POSITIVE ELECTRODE FOR AQUEOUS RECHARGEABLE BATTERY INCLUDING THE COMPOSITE CATALYST AND AQUEOUS RECHARGEABLE BATTERY INCLUDING THE POSITIVE ELECTRODE

(71) Applicant: KOREA INSTITUTE OF SCIENCE AND TECHNOLOGY, Seoul (KR)

(72) Inventors: Si Hyoung Oh, Seoul (KR); Hyungi Jo, Seoul (KR); Min Ji Jeong, Seoul (KR); Woo Joo No, Seoul (KR); Hyungseok Kim, Seoul (KR); Minah Lee, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 351 days.

(21) Appl. No.: 17/874,966

(22) Filed: Jul. 27, 2022

(65) Prior Publication Data
US 2023/0170537 A1    Jun. 1, 2023

(30) Foreign Application Priority Data
Nov. 29, 2021    (KR) .......................... 10-2021-0167290

(51) Int. Cl.
*H01M 10/42*    (2006.01)
*C01G 45/02*    (2006.01)
*C01G 55/00*    (2006.01)

(52) U.S. Cl.
CPC ........ *H01M 10/4242* (2013.01); *C01G 45/02* (2013.01); *C01G 55/00* (2013.01); *C01P 2006/40* (2013.01); *H01M 2300/0002* (2013.01)

(58) Field of Classification Search
CPC .... C01G 45/02; C01G 55/00; H01M 10/4242
See application file for complete search history.

(56) References Cited

U.S. PATENT DOCUMENTS 6,333,123 B1 * 12/2001 Davis .................... H01M 10/52
429/57

FOREIGN PATENT DOCUMENTS

CN    103050701 A     4/2013
CN    104909352 A  *  9/2015
(Continued)

OTHER PUBLICATIONS

Machine translation of the Korean Search Report of Korean counterpart (no date) (Year: 0000).*
(Continued)

*Primary Examiner* — Amanda C. Walke
(74) *Attorney, Agent, or Firm* — NSIP Law

(57) ABSTRACT

Disclosed is a noble metal-manganese oxide composite catalyst for a positive electrode of an aqueous rechargeable battery that can regenerate a solvent of an aqueous electrolyte. Also disclosed are a method for preparing the composite catalyst, a positive electrode for an aqueous rechargeable battery including the composite catalyst, and an aqueous rechargeable battery including the positive electrode. The composite catalyst can regenerate reaction products, including gases continuously generated from spontaneous corrosion of the electrodes or side reactions, back to water to prevent depletion of the electrolyte. Due to this ability, the composite catalyst improves the life characteristics of the
(Continued)

vs.

battery and suppresses the occurrence of excessive overpotentials at the electrodes. Therefore, the use of the composite catalyst is effective in preventing the performance of the battery from deteriorating. In addition, the composite catalyst can prevent an increase in the internal pressure of the battery resulting from gas generation and reduce the risk of fire or explosion, contributing to a significant improvement in the safety of the battery.

8 Claims, 10 Drawing Sheets

(56) References Cited

FOREIGN PATENT DOCUMENTS

| | | |
|---|---|---|
| EP | 4 206 140 A1 | 7/2023 |
| KR | 10-2014-0015295 A | 2/2014 |
| KR | 10-2014-0056544 A | 5/2014 |
| KR | 10-2019-0032337 A | 3/2019 |
| WO | WO 02/01655 A2 | 1/2002 |
| WO | WO 2007/036274 A2 | 4/2007 |
| WO | WO-2016092004 A1 * | 6/2016 ........ H01M 10/4242 |
| WO | WO-2021064410 A1 * | 4/2021 ............. H01M 4/86 |

OTHER PUBLICATIONS

Wippermann, K., et al. "The inhibition of zinc corrosion by bisaminotriazole and other triazole derivatives." *Corrosion Science* 32.2 (1991): pp. 205-230.

Malkhandi, Souradip, et al. "Self-assembled monolayers of n-alkanethiols suppress hydrogen evolution and increase the efficiency of rechargeable iron battery electrodes." *Journal of the American Chemical Society* 135.1 (2013): pp. 347-353.

Egan, D. R., et al. "Developments in electrode materials and electrolytes for aluminium—air batteries." *Journal of Power Sources* 236 (2013): pp. 293-310.

* cited by examiner

COMPOSITE CATALYST FOR POSITIVE ELECTRODE OF AQUEOUS RECHARGEABLE BATTERY, METHOD FOR PREPARING THE COMPOSITE CATALYST, POSITIVE ELECTRODE FOR AQUEOUS RECHARGEABLE BATTERY INCLUDING THE COMPOSITE CATALYST AND AQUEOUS RECHARGEABLE BATTERY INCLUDING THE POSITIVE ELECTRODE

CROSS REFERENCE TO RELATED APPLICATION(S)

This application claims the benefit under 35 USC § 119(a) of Korean Patent Application No. 10-2021-0167290, filed on Nov. 29, 2021, in the Korean Intellectual Property Office, the entire disclosure of which is incorporated herein by reference for all purposes.

BACKGROUND OF THE INVENTION

1. Field of the Invention

The present invention relates to a noble metal-manganese oxide composite catalyst for a positive electrode of an aqueous rechargeable battery that can regenerate a solvent of an aqueous electrolyte, a method for preparing the composite catalyst, a positive electrode for an aqueous rechargeable battery including the composite catalyst, and an aqueous rechargeable battery including the positive electrode.

2. Description of the Related Art

In a rechargeable battery employing an aqueous electrolyte, side reactions may cause metal electrodes (including but not limited to, zinc, manganese, iron, nickel, aluminum, lead, and magnesium electrodes) to corrode, leading to spontaneous decomposition of a solvent of the electrolyte, or electrode reactions may result in decomposition of the solvent. This phenomenon causes depletion of the electrolyte, limiting the migration of ions in the electrolyte. The limited ion migration drastically deteriorates the performance of the battery and even makes it impossible to drive the battery any more.

For these reasons, various alloying technologies for enhancing the corrosion resistance of metal electrodes and electrolyte additive technologies for metal surface protection have been developed thus far. However, such metals cannot be fundamentally protected from corrosion owing to their thermodynamic instability in aqueous electrolytes.

In order to attenuate this corrosion phenomenon as much as possible, approaches have been mobilized to introduce an electrolyte immediately before using a battery or remove an electrolyte when a battery is not in operation. However, these approaches require the use of additional equipment or lead to the formation of a thick passive film on the electrode surface, causing an increase in irreversibility such as a significant increase in driving overpotential when reused.

Further, electrolyte decomposition involves continuous gas generation, leading to an increase in the internal pressure of the battery, which is a major threat to battery safety.

Thus, there is a need for a technology that can provide solutions to the problems encountered in aqueous rechargeable battery systems employing aqueous electrolytes, such as electrolyte depletion caused by solvent decomposition and increased internal pressure of the batteries caused by gas generation.

PRIOR ART DOCUMENTS

Non-Patent Documents (Non-Patent Document 001) J. Penninger et al., Corrosion Science 32 (1991) 205-230
(Non-Patent Document 002) S. R. Narayanan et al., J. Am. Chem. Soc. 135 (2013) 347-353
(Non-Patent Document 003) P. de Leon et al., J. Power Sources 236 (2013) 293-310

SUMMARY OF THE INVENTION

The present invention has been made in an effort to solve the above-described problems and one object of the present invention is to provide a composite catalyst for a positive electrode of an aqueous rechargeable battery that can reduce decomposition products of water as a solvent back to water in an aqueous rechargeable battery system. A further object of the present invention is to provide a method for preparing the composite catalyst.

One aspect of the present invention provides a noble metal-manganese oxide composite catalyst for a positive electrode of an aqueous rechargeable battery that can regenerate a solvent of an aqueous electrolyte.

A further aspect of the present invention provides a method for preparing a noble metal-manganese oxide composite catalyst for a positive electrode of an aqueous rechargeable battery, including (1) dissolving a manganese precursor in distilled water to prepare an aqueous manganese precursor solution, (2) adding a permanganate to the aqueous manganese precursor solution to prepare a manganese precursor/permanganate mixed solution, (3) subjecting the manganese precursor/permanganate mixed solution to hydrothermal synthesis at a temperature of 150 to 250° C., (4) washing and drying the product of the hydrothermal synthesis to obtain a manganese oxide, and (5) mixing the manganese oxide with a noble metal supported on a carbon-based support.

Another aspect of the present invention provides a positive electrode for an aqueous rechargeable battery including (i) a composite catalyst for a positive electrode of an aqueous rechargeable battery, (ii) a conductive material, and (iii) a binder. Yet another aspect of the present invention provides an aqueous rechargeable battery including the positive electrode.

The composite catalyst of the present invention can regenerate reaction products, including hydrogen gas continuously generated from spontaneous corrosion of the electrodes or side reactions, back to water to prevent depletion of the electrolyte. Due to this ability, the composite catalyst improves the life characteristics of the battery and suppresses the occurrence of excessive ovepotentials at the electrodes. Therefore, the use of the composite catalyst is effective in preventing the performance of the battery from deteriorating. In addition, the composite catalyst of the present invention can prevent an increase in the internal pressure of the battery resulting from gas generation and reduce the risk of explosion, contributing to a significant improvement in the safety of the battery.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE INVENTION

Figure 1:
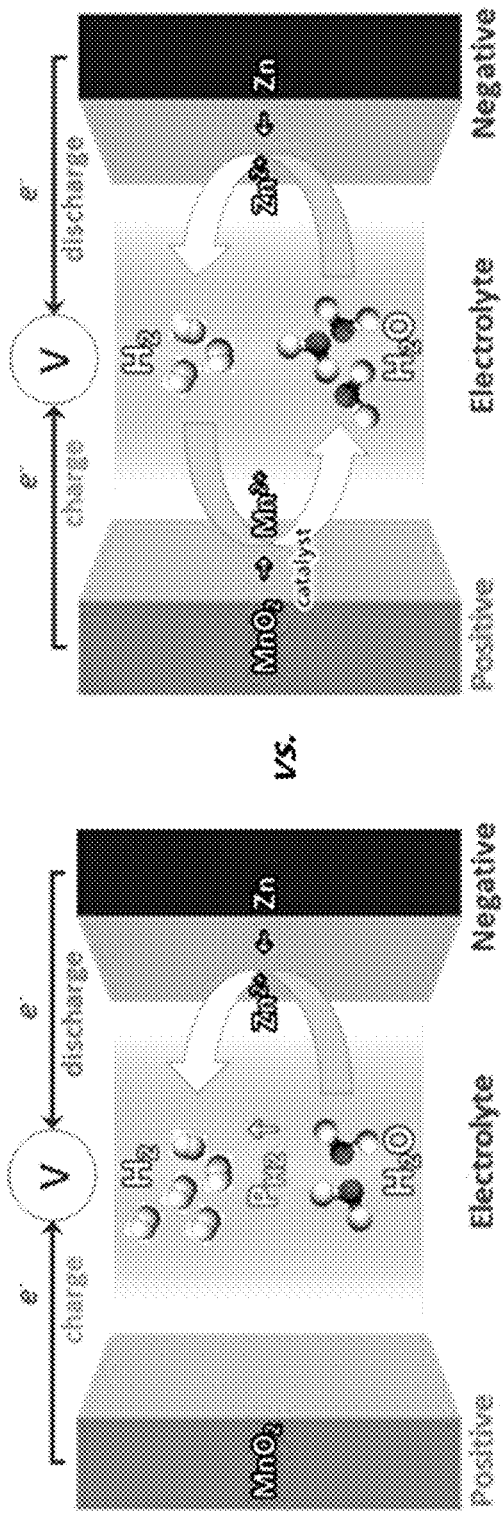
FIG. 1 shows (left) a schematic diagram explaining the problems encountered in the use of a metal such as iron, zinc or aluminum as a negative electrode of a conventional aqueous rechargeable battery, for example, hydrogen generation and electrolyte depletion due to metal corrosion, and (right) a schematic diagram explaining the working principle of a catalyst capable of producing water from hydrogen that can solve the problems.

The present invention will now be described in detail.

As used herein, the term "composite catalyst" refers to a catalyst in which two or more compounds with respective roles are complexed with each other to perform the function of accelerating a desired chemical reaction. Ony when the two or more materials are in close contact with each other can the composite catalyst accelerate the desired chemical reaction, which cannot be achieved by either one of the materials only.

As used herein, the term "complexing" means that two or more materials are uniformly and intimately mixed with each other while clearly maintaining their respective phases and being in physical contact with each other on a microscopic scale. The physical contact is intended to include point contact, line contact, and surface contact. This term is clearly distinguished from simple mixing without physical contact or with only point contact between materials.

A noble metal-manganese oxide catalyst of the present invention is intended for regenerating a solvent in an aqueous rechargeable battery and plays a role in converting decomposition products, including gases generated by metal corrosion, back to water through a series of chemical and electrochemical reactions. For effective conversion to water, it is important that the nano-sized noble metal particles adsorb the gas components and are uniformly distributed while being in close contact with the surface of the manganese oxide, where the noble metal particles actually chemically react with the gases. In the case of a catalyst in which a noble metal is simply mixed with a manganese oxide, gases are distant from the manganese oxide although they are adsorbed on the surface of the noble metal. As a result, it is difficult for the gases to move to the surface of the manganese oxide, making it impossible for the catalyst to satisfactorily perform its role. In the present invention, it is very important to complex the noble metal particles with the manganese oxide through close physical contact, including line contact and surface contact. In the Examples section that follows, a SPEX mill (SPEX 8000D mixer/mill, 1060 cycles per minute) as a high-energy mixer was used to complex the noble metal on carbon black with the manganese dioxide.

The roles of the noble metal-manganese oxide composite catalyst according to the present invention are as follows. The noble metal, preferably palladium, acts to adsorb hydrogen gas, a decomposition product of a solvent in an aqueous rechargeable battery, on the surface of the composite catalyst. The adsorbed hydrogen again chemically reacts with the manganese oxide, preferably manganese dioxide, around the noble metal to produce water. If the two materials are not closely complexed with each other, the water regeneration reaction cannot effectively occur. In the case where the noble metal and the manganese oxide are not complexed with each other and are simply mixed with each other, the two materials are distant from each other. Since the two materials are not in close contact with each other, the water regeneration reaction does not occur well. Manganese ions are dissolved from the manganese oxide into the electrolyte by the water regeneration reaction and are converted back to a manganese oxide during charging of the battery.

One aspect of the present invention is directed to a noble metal-manganese oxide composite catalyst for a positive electrode of an aqueous rechargeable battery that can regenerate a solvent of an aqueous electrolyte.

The weight ratio of the manganese oxide to the noble metal is in the range of 100:0.0001-100, preferably 100:0.0005-50, more preferably 100:0.001-10, even more preferably 100:0.005-5, still more preferably 100:0.01-1, most preferably 100:0.01-0.8.

When the weight ratio of the manganese oxide to the noble metal is within the range defined above, the water regeneration or production reaction in the aqueous rechargeable battery can be further promoted. If the weight ratio is less than the lower limit, the effect of the composite catalyst is not clearly achieved. Meanwhile, if the weight ratio exceeds the upper limit, the function of the composite catalyst is not problematic but the excessive use of the expensive catalyst does not benefit from an economic viewpoint.

In an aqueous rechargeable battery employing an aqueous electrolyte, side reactions may cause metal electrodes (including but not limited to, zinc, manganese, iron, nickel, aluminum, lead, and magnesium electrodes) to corrode, leading to spontaneous decomposition of a solvent of the electrolyte, or electrode reactions may result in decomposition of the solvent.

The noble metal-manganese oxide composite catalyst of the present invention can induce a reaction for regenerating or producing water from hydrogen gas as a decomposition product of water, as depicted in Reaction Scheme 1:

$$pH_2(g) + qMnO_x \rightarrow rH_2O + sMn^{2+} \quad (1)$$

The chemical reaction depicted in Reaction Scheme 1 hardly proceeds under un-catalyzed conditions due to its high activation energy and requires a noble metal catalyst such as Pd, Rh, Ru, Ir or Pt that can increase its rate. Meanwhile, the manganese ions ($Mn^{2+}$) generated by the chemical reaction may be dissolved in the electrolyte or may exist in the form of a manganese oxide or hydroxide in the electrode.

Since the manganese ions ($Mn^{2+}$) again are converted back to a manganese oxide during electrochemical charging of the battery, as depicted in Reaction Equation 2:

$$aMn^{2+} + bOH^- \rightarrow cMnO_y + dH_2O + fe^- \quad (2)$$

Accordingly, water can be continuously regenerated or produced from the decomposition product of the electrolyte (water) without consumption of the catalyst despite repeated cycles. The composition and structure of the produced manganese oxide ($MnO_y$) may be the same as those of the manganese oxide ($MnO_x$) as a component of the composite catalyst. The manganese oxide ($MnO_y$) together with the noble metal particles can continuously serve as a composite catalyst.

Figure 2:
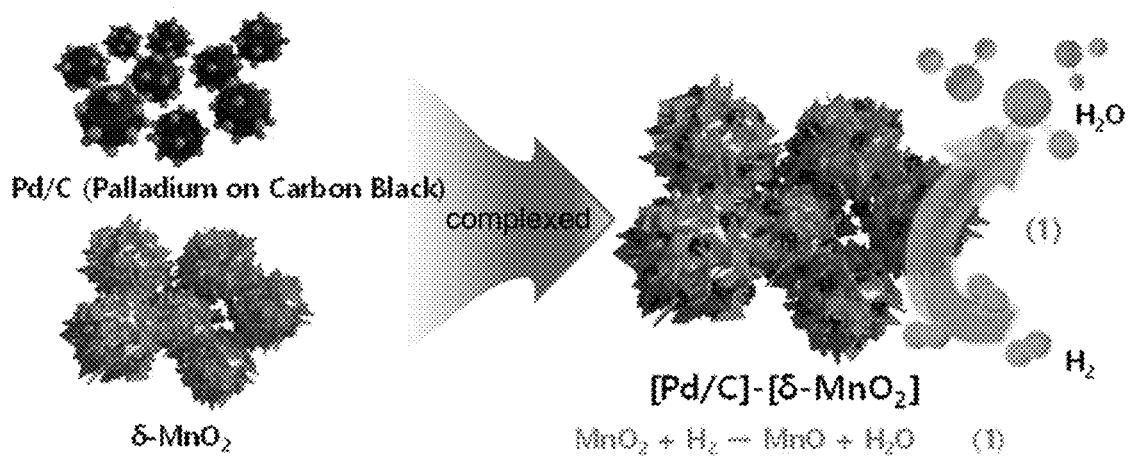
FIG. 2 is a diagram schematically showing a palladium-manganese oxide composite catalyst ([Pd/C]-[δ-MnO$_2$]) prepared in Example 1.

It is general that the noble metal nanoparticles of the composite catalyst are uniformly distributed on a carbon support with a large specific surface area. The noble metal nanoparticles are uniformly distributed while being in close contact with the surface of the manganese oxide particles (see FIG. 2).

The noble metal particles are complexed with the manganese oxide in a state in which they are dispersed on a catalyst support (e.g., a carbon-based support) with a large specific surface area, so that the chemical reactions depicted in Reaction Schemes 1 and 2 can be accelerated as much as possible. At this time, the noble metal nanoparticles are supported in an amount of 0.0001 to 50% by weight, preferably 0.01 to 50% by weight, more preferably 0.1 to 30% by weight, even more preferably 1 to 25% by weight, still more preferably 5 to 20% by weight, most preferably 8 to 12% by weight, based on the weight of the carbon-based support.

The carbon support may be selected from carbon black, activated carbon, carbon nanotubes, carbon fibers, fullerenes, graphene, and mixtures thereof.

In one embodiment, the noble metal nanoparticles may be supported on a carbon support and may be uniformly mixed and complexed with the manganese oxide particles.

More specifically, the noble metal nanoparticles may have a size of several nanometers, i.e. an average diameter of 1 to 20 nm, preferably 1 to 10 nm, more preferably 2 to 8 nm, and may be directly complexed with the manganese oxide particles or may be supported on a carbon-based support having a size of several tens of nanometers, i.e. an average diameter of 10 to 100 nm, before being complexed with the manganese oxide particles.

The noble metal may be selected from palladium (Pd), rhodium (Rh), ruthenium (Ru), iridium (Ir), platinum (Pt), and mixtures thereof, and is preferably palladium (Pd) or platinum (Pt).

The manganese oxide particles have an average diameter of 0.5 to 1.5 μm, preferably 0.7 to 1.3 μm, more preferably 0.8 to 1.2 μm, even more preferably 0.9 to 1.1 μm.

The manganese oxide may be represented by $MnO_x$ (1≤x≤4). The manganese oxide is preferably selected from $MnO_2$, $Mn_2O_3$, $Mn_3O_4$, MnOOH, and mixtures thereof. The manganese oxide is more preferably $MnO_2$. The manganese oxide may have a layered, tunnel or amorphous structure. Preferably, the manganese oxide has a layered structure. More preferably, the manganese oxide particles are spherical particles with a layered structure (see FIGS. 2 to 4).

A further aspect of the present invention is directed to a method for preparing a composite catalyst for a positive electrode of an aqueous rechargeable battery, including (1) dissolving a manganese precursor in distilled water to prepare an aqueous manganese precursor solution, (2) adding a permanganate to the aqueous manganese precursor solution to prepare a manganese precursor/permanganate mixed solution, (3) subjecting the manganese precursor/permanganate mixed solution to hydrothermal synthesis at a temperature of 150 to 250° C., (4) washing and drying the product of the hydrothermal synthesis to obtain a manganese oxide, and (5) mixing the manganese oxide with a noble metal supported on a carbon-based support.

According to the method of the present invention, first, a manganese precursor is dissolved in distilled water to prepare an aqueous manganese precursor solution (step (1)).

The manganese precursor may be selected from manganese sulfate ($MnSO_4$), manganese nitrate ($Mn(NO_3)_2$), manganese chloride ($MnCl_2$), manganese acetate ($Mn(CH_3COO)_2$), hydrates thereof, and mixtures thereof.

The aqueous manganese precursor solution has a concentration of 0.001 to 10 M, preferably 0.002 to 1 M, more preferably 0.005 to 0.5 M, even more preferably 0.01 to 0.1 M.

In step (2), a permanganate is added to the aqueous manganese precursor solution to prepare a manganese precursor/permanganate mixed solution.

The permanganate may be potassium permanganate ($KMnO_4$) or sodium permanganate ($NaMnO_4$).

The permanganate is added in a molar ratio of 1-20:1, preferably 3-10:1, more preferably 4-8:1, even more preferably 5-7:1 relative to the manganese precursor.

In step (3), the manganese precursor/permanganate mixed solution is subjected to hydrothermal synthesis at a temperature of 150 to 250° C., preferably 170 to 220° C., more preferably 180 to 200° C., for 6 to 24 hours, preferably 8 to 16 hours, more preferably 10 to 14 hours.

When the hydrothermal synthesis is performed within the temperature and time ranges defined above, the manganese precursor and the permanganate particles are prevented from aggregation and are evenly dispersed, facilitating the synthesis of a desired product.

In step (4), the product of the hydrothermal synthesis is washed and dried to obtain a manganese oxide. The washing and drying are performed to remove impurities present in the product of the hydrothermal synthesis. Specifically, the product of the hydrothermal synthesis is centrifuged 3 to 7 times with distilled water and the resulting precipitate is dried at 60 to 100° C., preferably 70 to 90° C. for 12 to 36 hours, preferably 24 to 32 hours to obtain a pure manganese oxide free of impurities.

The manganese oxide particles have an average diameter of 0.5 to 1.5 μm, preferably 0.7 to 1.3 μm, more preferably 0.8 to 1.2 μm, even more preferably 0.9 to 1.1 μm.

The manganese oxide may be represented by $MnO_x$ (1≤x≤4). The manganese oxide is preferably selected from $MnO_2$, $Mn_2O_3$, $Mn_3O_4$, MnOOH, and mixtures thereof. The manganese oxide is more preferably $MnO_2$. The manganese oxide may have a layered, tunnel or amorphous structure.

Preferably, the manganese oxide has a layered structure. More preferably, the manganese oxide particles are spherical particles with a layered structure (see FIGS. 2 to 4).

In step (5), the manganese oxide is mixed with a noble metal or a noble metal supported on a carbon-based support.

The weight ratio of the manganese oxide to the noble metal is in the range of 100:0.0001-100, preferably 100:0.0005-50, more preferably 100:0.001-10, even more preferably 100:0.005-5, still more preferably 100:0.01-1, most preferably 100:0.01-0.8. When the weight ratio of the manganese oxide to the noble metal is within the range defined above, the water regeneration or production reaction in the aqueous rechargeable battery can be further promoted. If the weight ratio is less than the lower limit, the effect of the final composite catalyst is not clearly achieved. Meanwhile, if the weight ratio exceeds the upper limit, the function of the final composite catalyst is not problematic but the excessive use of the expensive catalyst does not benefit from an economic viewpoint.

The noble metal is supported in an amount of 0.0001 to 50% by weight, preferably 0.01 to 50% by weight, more preferably 0.1 to 30% by weight, even more preferably 1 to 25% by weight, still more preferably 5 to 20% by weight, most preferably 8 to 12% by weight, based on the weight of the carbon-based support. The carbon-based support may be selected from carbon black, activated carbon, carbon nanotubes, carbon fibers, fullerenes, graphene, and mixtures thereof. The supporting of the noble metal on the carbon-based support increases the rates of the chemical reactions depicted in Reaction Schemes 1 and 2 so that the reactions can be accelerated as much as possible. If the amount of the noble metal supported on the carbon-based support is less than the lower limit, the effects of the catalyst on the chemical reactions are not satisfactory as expected. Meanwhile, if the amount of the noble metal supported on the carbon-based support exceeds the upper limit, the excessive use of the noble metal does not benefit from an economic viewpoint.

More specifically, the noble metal nanoparticles have a size of several nanometers, i.e. an average diameter of 1 to 20 nm, preferably 1 to 10 nm, more preferably 2 to 8 nm, and may be directly complexed with the manganese oxide particles or may be supported on a carbon-based support having a size of several tens of nanometers, i.e. an average diameter of 10 to 100 nm, before being complexed with the manganese oxide particles.

The noble metal may be selected from palladium (Pd), rhodium (Rh), ruthenium (Ru), iridium (Ir), platinum (Pt), and mixtures thereof. The noble metal is preferably palladium (Pd) or platinum (Pt), which may be advantageous in improving the performance of the aqueous rechargeable battery.

The mixing may be performed by various methods such as simple mixing, ball milling, and coating but is preferably performed by high-energy ball milling, during which the materials are brought into close physical contact with each other. The physical contact is intended to include line contact and surface contact. As a result of the mixing, the manganese oxide particles can be closely complexed with the noble metal particles. The high-energy ball milling can be performed using a mill selected from shaker mills, vibratory mills, SPEX mills, planetary mills, and attritor mills. In the noble metal-manganese oxide composite catalyst, the noble metal nanoparticles and the manganese oxide particles are evenly distributed while being in close contact with each other. In addition, since the noble metal nanoparticles and the manganese oxide particles are in very close contact with each other, they exert combined effects such that the water regeneration reaction in the aqueous rechargeable battery is effectively accelerated.

The thus prepared noble metal-manganese oxide composite catalyst regenerates the reaction products, including hydrogen gas, back to water to prevent depletion of the electrolyte. Due to this ability, the composite catalyst improves the life characteristics of the aqueous rechargeable battery and suppresses the occurrence of excessive overpotentials at the electrodes. Therefore, the use of the composite catalyst is effective in preventing the performance of the battery from deteriorating.

Particularly, although not explicitly described in the Examples section that follows, metal-manganese oxide composite catalysts were prepared by varying the type of the manganese precursor, the type of the permanganate, the hydrothermal synthesis conditions, the type of the noble metal, the molar ratio of the manganese oxide to the noble metal, etc., electrodes including the noble metal-manganese oxide composite catalysts were produced, aqueous rechargeable batteries using the electrodes were fabricated, the aqueous rechargeable batteries were subjected to 300 cycles of charging and discharging, the surfaces of the positive electrodes were analyzed by scanning electron microscopy (SEM), and the durabilities of the positive electrodes were determined.

As a result, when the following conditions were all met, no side reactions between the electrodes and the electrolytes occurred at the electrolyte interfaces, no losses of the composite catalysts applied to the electrodes were observed, no losses of the electrolytes occurred, and the durability of the electrodes was very good.

(1) The manganese precursor is $MnSO_4 \cdot H_2O$, (2) the permanganate is $KMnO_4$, (3) the hydrothermal synthesis is performed at 185 to 200° C. for 12 to 14 hours, (4) the washing in step (4) is performed using distilled water, (5) the drying in step (4) is performed at 75 to 85° C. for 20 to 28 hours, (6) the noble metal supported on the carbon-based support is palladium (Pd/C), (7) the palladium is supported in an amount of 7 to 13% by weight, based on the weight of the carbon-based support, (8) the manganese oxide and the noble metal are mixed in a weight ratio of 100:0.2-0.8, and (9) the mixing is performed by high-energy ball milling for 20 to 40 minutes.

When any one of the above conditions was not met, not only the composite catalysts applied to the positive electrodes but also the electrolytes were significantly lost after 300 cycles of charging and discharging, resulting in a drastic decrease in the life of the batteries and poor stability of the electrodes.

Another aspect of the present invention is directed to a positive electrode for an aqueous rechargeable battery including (i) the noble metal-manganese oxide composite catalyst, (ii) a conductive material, and (iii) a binder.

The noble metal-manganese oxidation composite catalyst is present in a weight ratio of 100:0.0001-100, preferably 100:0.0005-50, more preferably 100:0.001-10, even more preferably 100:0.005-5, still more preferably 100:0.01-1, relative to the positive electrode.

Yet another aspect of the present invention is directed to an aqueous rechargeable battery including the positive electrode, a negative electrode, and an aqueous electrolyte.

The use of the composite catalyst in the aqueous rechargeable battery of the present invention ensures improved stability and electrochemical performance characteristics (including excellent charge/discharge life characteristics and cycle life characteristics) of the aqueous rechargeable battery.

The aqueous rechargeable battery is a safe battery system because the aqueous electrolyte is free from the danger of fire, unlike lithium ion batteries that are currently widely used in the market. In addition, the aqueous rechargeable battery is considered eco-friendly because its components are non-toxic. That is, since the components of the aqueous rechargeable battery are non-toxic and are free from the danger of fire, the battery is suitable as a power source for wearable medical devices and bio-implantable batteries.

The aqueous rechargeable battery can be assembled into a cell in an atmospheric environment, which is advantageous in terms of processing cost. In addition, since the components of the aqueous rechargeable battery are inexpensive compared to those of lithium secondary batteries, the aqueous rechargeable battery is suitable as a medium and large sized energy storage device.

The present invention will be more specifically explained with reference to the following examples. However, these examples are not to be construed as limiting or restricting the scope and disclosure of the invention. It is to be understood that based on the teachings of the present invention including the following examples, those skilled in the art can readily practice other embodiments of the present invention whose experimental results are not explicitly presented. Such modifications and variations are intended to come within the scope of the appended claims.

Example 1: Production of Catalyst [Pd/C]-[δ-MnO$_2$]-Coated Electrode (1) Preparation of Layered Manganese Oxide δ-MnO$_2$ 0.169 g of MnSO$_4$·H$_2$O was added to and completely dissolved in 70 mL of distilled water, and then 0.9482 g of KMnO$_4$ was added thereto with stirring. The solution was further stirred for 1 h.

The solution was subjected to hydrothermal synthesis in an oven at 190° C. for 12 h.

The resulting δ-MnO$_2$ powder was passed through a filter, sufficiently washed with distilled water, and dried in an oven at 80° C. for 24 h to prepare layered manganese oxide δ-MnO$_2$.

(2) Preparation of Palladium-Manganese Oxide Composite Catalyst [Pd/C]-[δ-MnO$_2$]

200 mg of the layered manganese oxide δ-MnO$_2$ and 10 mg of carbon black (Pd/C) supported with 10 wt % of palladium (Pd/C) (Sigma-Aldrich) were ball-milled using the SPEX 8000D mixer/mill at 1060 cpm for 30 min. As a result, the palladium was complexed with the manganese oxide to prepare a palladium-manganese oxide composite catalyst [Pd/C]-[δ-MnO$_2$] (see FIG. 2).

(3) Production of Electrode Using the Palladium-Manganese Oxide Composite Catalyst [Pd/C]-[δ-MnO$_2$]

210 mg of the palladium-manganese oxide composite catalyst [Pd/C]-[δ-MnO$_2$], 20 mg of a conductive material (Super P), and 15 mg of a binder (PVdF) were uniformly dispersed and mixed with 750 mg of N-methyl-2-pyrrolidone (NMP) to prepare a slurry.

The slurry was coated to a thickness of 150 μm on a 0.032 mm thick titanium foil (purity 99.7%) using a doctor blade and dried in an oven at 80° C. to produce an electrode.

Comparative Example 1: Production of δ-MnO$_2$ Catalyst-Coated Electrode

An electrode was produced in the same manner as in Example 1, except that the layered manganese oxide δ-MnO$_2$ prepared in step (1) was used in step (3) instead of the palladium-manganese oxide composite catalyst prepared in step (2).

Experimental Example 1. X-ray Diffraction Analysis

Figure 3A:
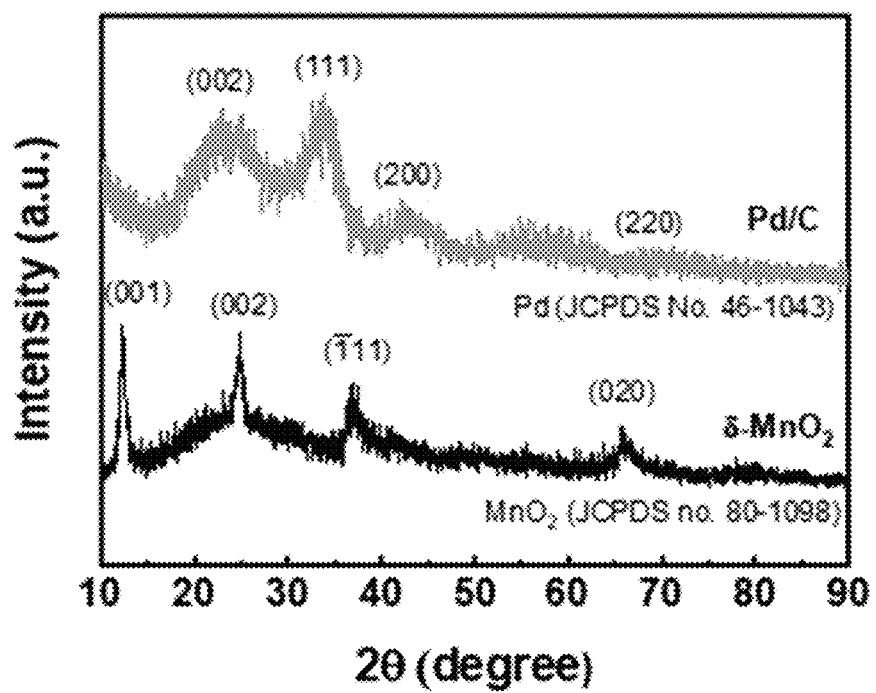
FIGS. 3A and 3B show X-ray diffraction patterns of manganese dioxide (δ-MnO$_2$), palladium (Pd/C), and a palladium-manganese oxide composite catalyst ([Pd/C]-[δ-MnO$_2$]) prepared using manganese dioxide and palladium in Example 1.
Figure 3B:
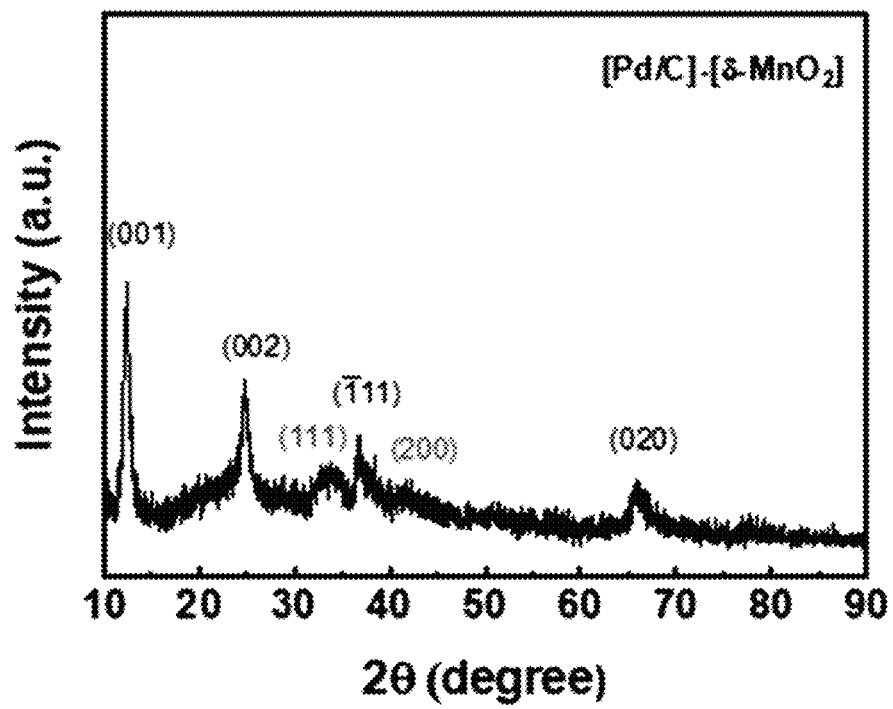
Figure 4A:
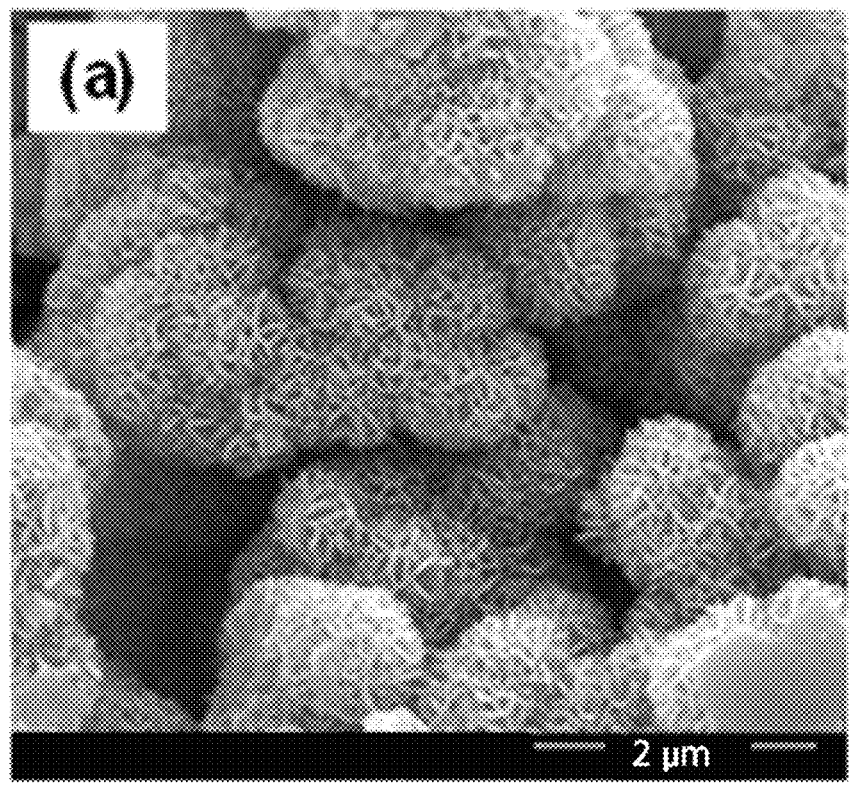
FIGS. 4A to 4F show scanning electron microscopy (SEM) images revealing the surface morphologies of (a) and (b) layered manganese oxide (δ-MnO$_2$) prepared in Example 1, (c) a catalyst (δ-MnO$_2$)-coated electrode produced in Comparative Example 1, (d) and (e) a palladium-supported carbon-based support (Pd/C), and (f) a catalyst [Pd/C]-[δ-MnO$_2$]-coated electrode produced in Example 1.
Figure 4B:
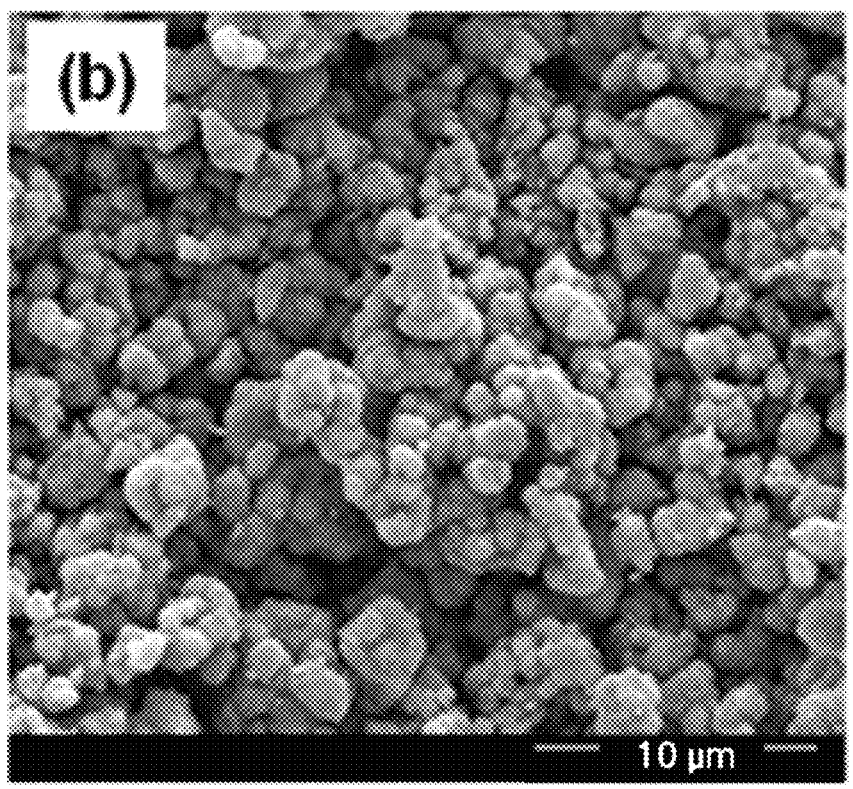
Figure 4C:
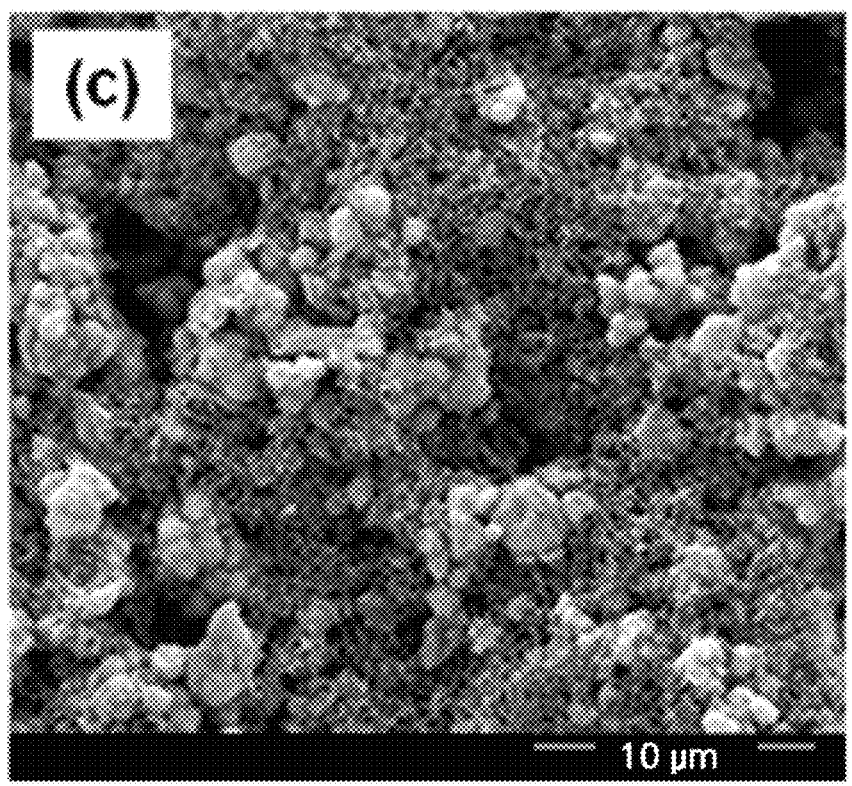
Figure 4D:
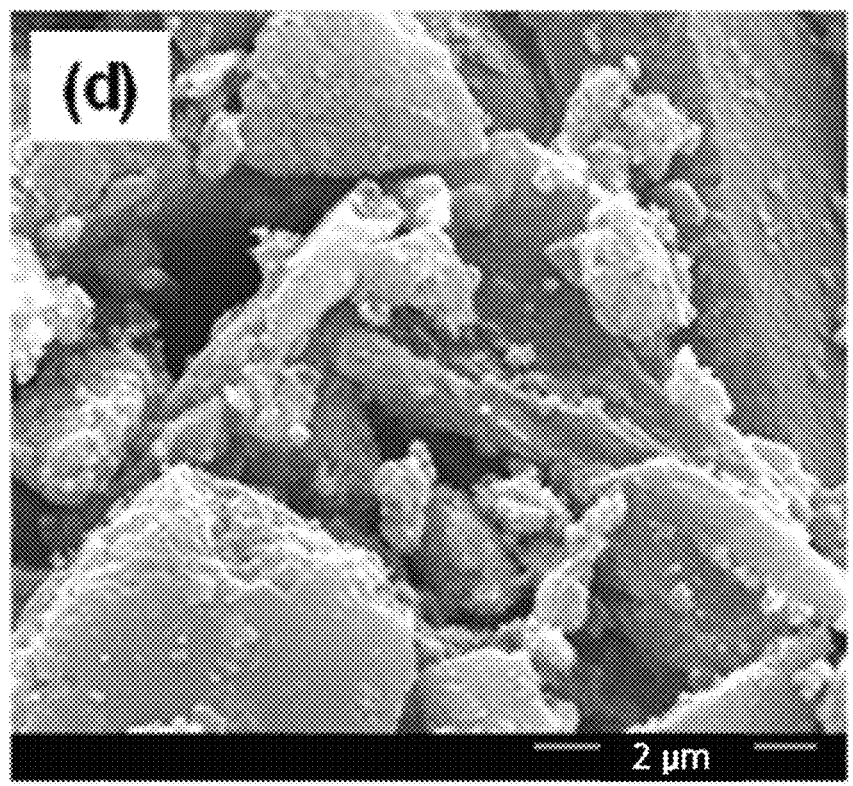
Figure 4E:
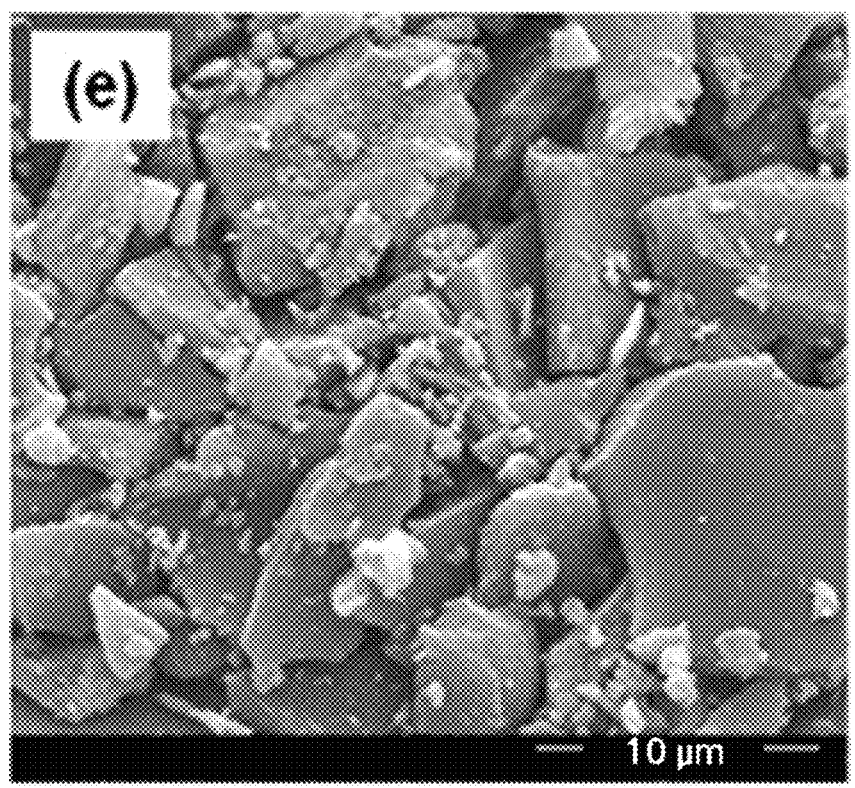
Figure 4F:
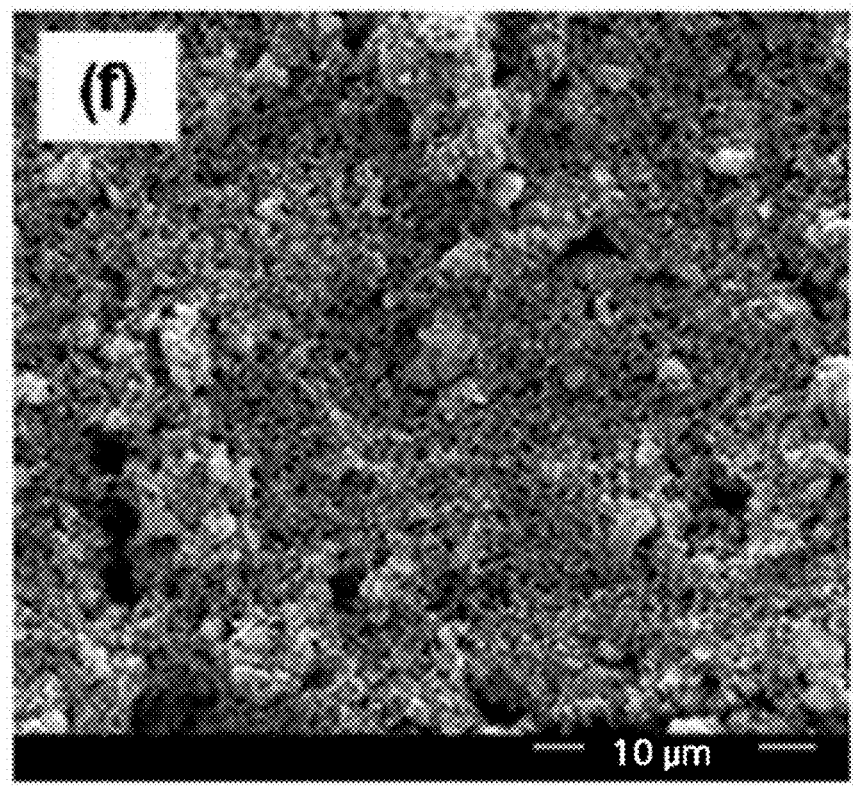

The crystallinity of the metal single atom catalyst prepared in Example 1 was analyzed by X-ray diffraction (XRD). In FIG. 3, (a) shows X-ray diffraction patterns of the manganese dioxide (δ-MnO$_2$) and the palladium (Pd/C) and (b) shows an X-ray diffraction pattern of the palladium-manganese oxide composite catalyst ([Pd/C]-[δ-MnO$_2$]).

Referring to FIG. 3, the X-ray diffraction patterns of the Pd/C and the δ-MnO$_2$ distinctly appeared in the X-ray diffraction pattern of the palladium-manganese oxide composite catalyst ([Pd/C]-[δ-MnO$_2$]).

The δ-MnO$_2$ was confirmed to have a layered crystal structure with an interlayer spacing of ~7 Å. The Pd/C was confirmed to have palladium grains with a size of several nanometers from the widths of the XRD peaks.

Experimental Example 2. Scanning Electron Microscopy (SEM)

The surface morphologies of the layered manganese oxide (δ-MnO$_2$) and the palladium-supported carbon black support (Pd/C) were observed using a scanning electron microscope (SEM). The surface morphologies of the electrodes produced in Example 1 and Comparative Example 1 were also observed and compared.

Referring to (a) and (b) of FIG. 4, the δ-MnO$_2$ had many surface wrinkles and was spherical in shape with a diameter of ~1 μm. Pd/C is known to have a shape in which Pd particles with a size of several nanometers are coated on a carbon-based support having a size of several tens of nanometers. In practice, the SEM images (d) and (e) revealed that the Pd/C particles aggregated into secondary particles having a size of several tens of nanometers.

Aggregates were observed in the electrode produced in Comparative Example 1 ((c) of FIG. 4), whereas no aggregates were observed and the palladium was closely and uniformly mixed with the manganese dioxide after ball milling in the electrode produced in Example 1 ((f) of FIG. 4).

Experimental Example 3. Measurement of Amounts of Manganese Ions Dissolved into Electrolytes Each of the electrodes produced in Example 1 and Comparative Example 1 was cut into a circular disc. The circular disc as a positive electrode, a 100 μm zinc metal plate as a negative electrode, glass wool as a separator, and a 2.0 M aqueous ZnSO$_4$ solution as an electrolyte were assembled into a CR2032 type A coin cell.

After 0, 5, 10, 20, and 30 days of operation, the coin cell was disassembled and the amounts of manganese ions (Mn$^{2+}$) dissolved into the electrolyte were measured.

Figure 5:
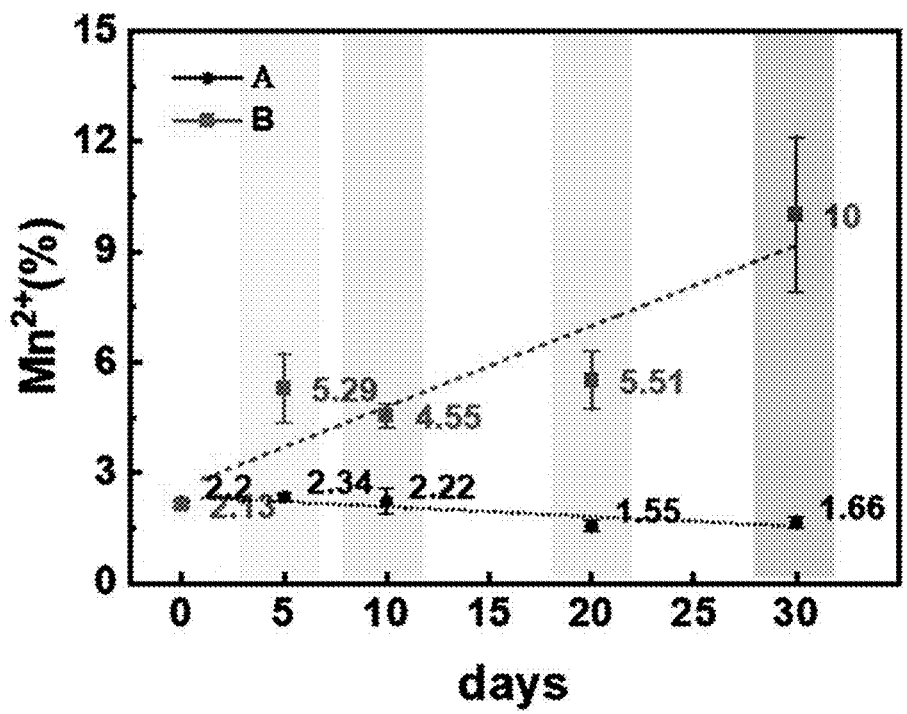
FIG. 5 shows the amounts of manganese ions dissolved into an electrolyte in a coin cell A including an electrode produced in Comparative Example 1 and an electrolyte in a coin cell B including an electrode produced in Example 1 over time after assembly.

As a result, the amounts of manganese ions dissolved into the electrolyte in the coin cell (A: δ-MnO$_2$) including the electrode of Comparative Example 1 were maintained at a level of <2.4% regardless of the operating time, whereas the amounts of manganese ions dissolved into the electrolyte in the coin cell (B: [Pd/C]-[δ-MnO$_2$]) including the electrode of Example 1 increased linearly with time and increased ~5 times the initial value after 30 days of operation, as shown in FIG. 5.

These results demonstrate that the chemical reaction depicted in Reaction Scheme 1 continues to proceed in the presence of the inventive palladium-manganese oxide composite catalyst ([Pd/C]-[δ-MnO$_2$]), indicating that hydrogen generated as a result of electrolyte decomposition is regenerated back to water.

Experimental Example 4. Analysis of Charge Curves of Coin Cells

Coin cells were assembled in the same manner as in Experimental Example 3.

After 1, 10, 20, and 30 days of operation, each of the coin cells was charged at a current density of 15 mA/g. Charge curves of the coin cell are shown in FIG. 6.

Figure 6:
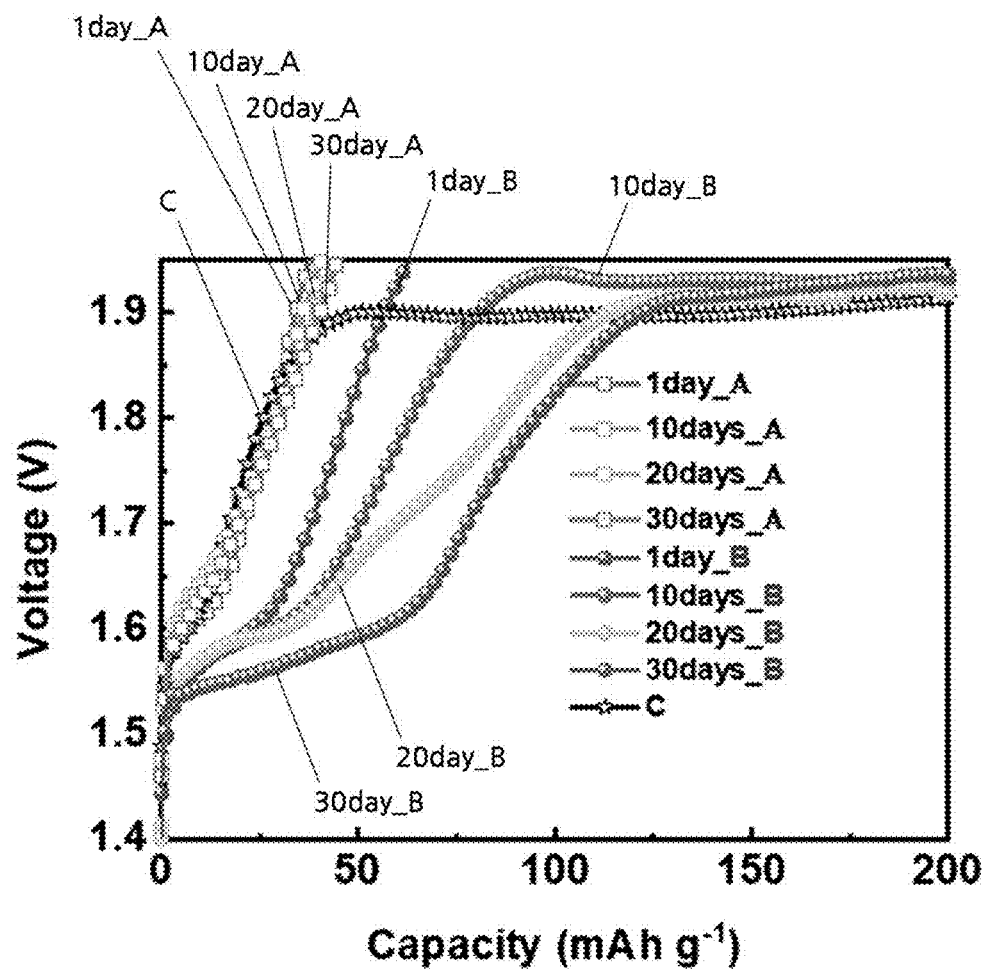
FIG. 6 shows charge curves of a coin cell A including an electrode produced in Comparative Example 1, a coin cell B including an electrode produced in Example 1, and a coin cell C using an aqueous electrolyte containing 2 M ZnSO$_4$ and 0.2 M MnSO$_4$. Here, the coin cells were charged at a current density of 15 mA/g.

Referring to FIG. 6, the capacities of the coin cell (A: δ-MnO$_2$) including the electrode of Comparative Example 1 at 1.8 V on days 1, 10, 20, and 30 were ~25 mAhg$^{-1}$ and the charge curves were not significantly changed. In contrast, the capacities of the coin cell (B: [Pd/C]-[δ-MnO$_2$]) including the electrode of Example 1 after charging to 1.8 V were gradually increased to 46.9, to 63.1, 86.3, and 95.2 mAhg$^{-1}$ on days 1, 10, 20, and 30 days, respectively.

These results are because the amount of manganese ions (Mn$^{2+}$) dissolved is gradually increased by the water regeneration reaction depicted in Reaction Scheme 1 in the presence of the inventive palladium-manganese oxide composite catalyst ([Pd/C]-[δ-MnO$_2$]).

Experimental Example 5. Analysis of Gases Generated During Operation of Coin Cells for Different Times Coin cells with a central hole in the bottom case for gas emission were assembled in the same manner as in Experimental Example 3. The types and amounts of gases generated as a result of electrolyte decomposition were investigated using DEMS, a tool for detecting gases generated by electrochemical reactions of electrolytes.

Specifically, gases generated from each coin cell were collected at 10-h intervals for a total of 30 h and analyzed using DEMS under a flow of argon as a carrier gas.

Figure 7:
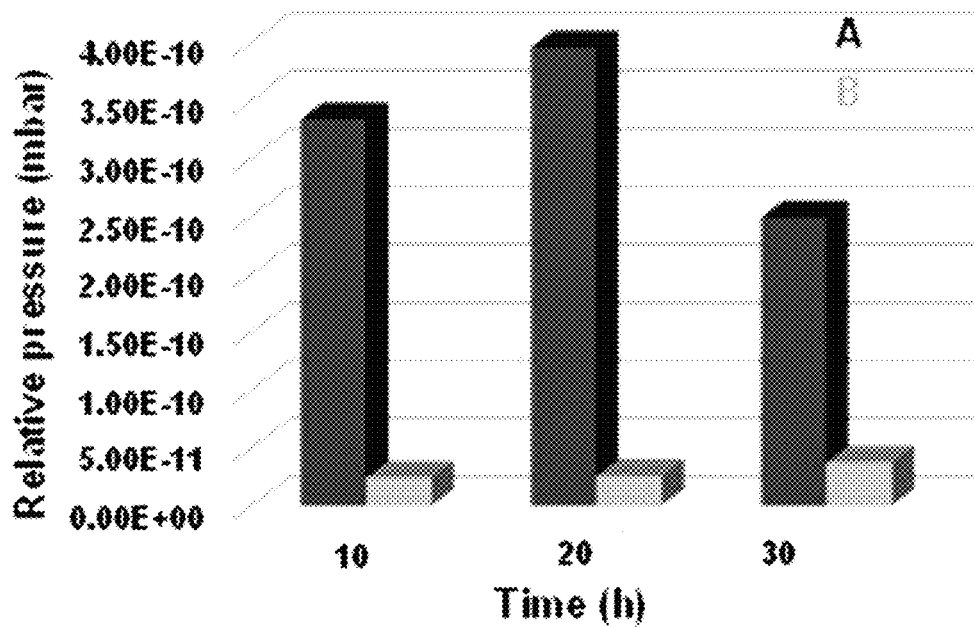
FIG. 7 shows the amounts of gas generated from a coin cell A including an electrode produced in Comparative Example 1 and a coin cell B including an electrode produced in Example 1 over time after assembly.

Referring to FIG. 7, the amounts of hydrogen gas generated from the coin cell (B: [Pd/C]-[δ-MnO$_2$]) including the electrode produced in Example 1 were reduced to ~1/10 of those from the coin cell (A: δ-MnO$_2$) including the electrode produced in Comparative Example 1.

These results indicate that the palladium-manganese oxide composite catalyst ([Pd/C]-[δ-MnO$_2$]) effectively improves the rate of the water regeneration reaction depicted in Reaction Scheme 1.

Example 6. Electrochemical Properties of Coin Cells

Coin cells were assembled in the same manner as in Experimental Example 3, except that an aqueous solution of mixed salts of 2.0 M ZnSO$_4$ and 0.1 M MnSO$_4$ was used as an electrolyte instead of the 2.0 M aqueous ZnSO$_4$ solution.

Thereafter, each coin cell was charged and discharged in the voltage range of 0.8-1.8 V at a constant current of 300 mA/g.

Figure 8A:
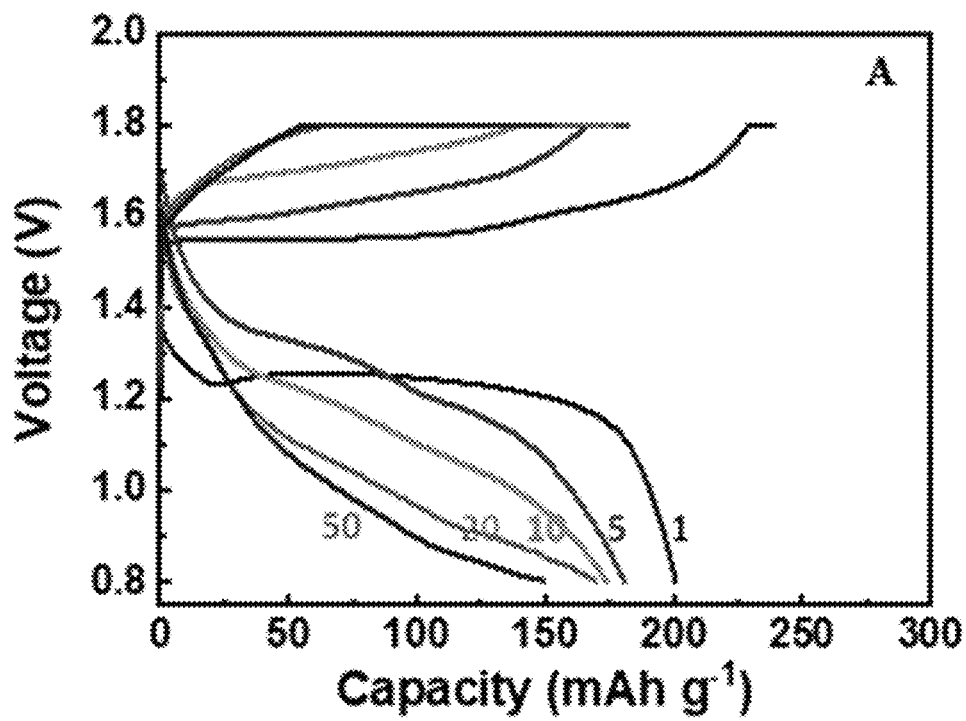
FIGS. 8A and 8B show charge-discharge curves of (a) a coin cell using an electrode produced in Comparative Example 1 and (b) a coin cell using an electrode produced in Example 1 at various operating times.
Figure 8B:
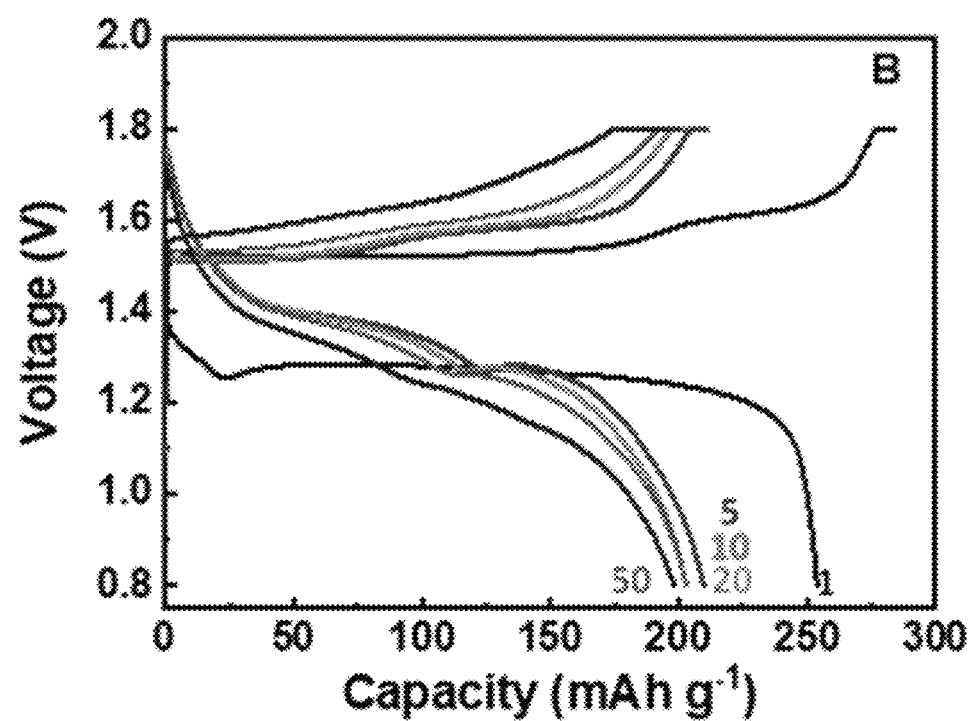

Referring to FIG. 8, the coin cell (A: δ-MnO$_2$) including the electrode of Comparative Example 1 showed discharge capacities of 200.7, 212.2, 180.4, 173.8, 169.6, 149.5, and 126.3 mAhg$^{-1}$ after 1, 2, 5, 10, 20, 50, and 100 cycles, respectively. In contrast, the coin cell (B: [Pd/C]-[δ-MnO$_2$]) including the electrode of Example 1 showed discharge capacities of 253.9, 245.3, 209.5, 202.8, 203.2, 198.1, and 173.3 mAhg$^{-1}$ after 1, 2, 5, 10, 20, 50, and 100 cycles, respectively, demonstrating its higher capacity retention. In addition, the coin cell including the electrode of Example 1 was found to maintain its initial charge/discharge curve shape.

Figure 9:
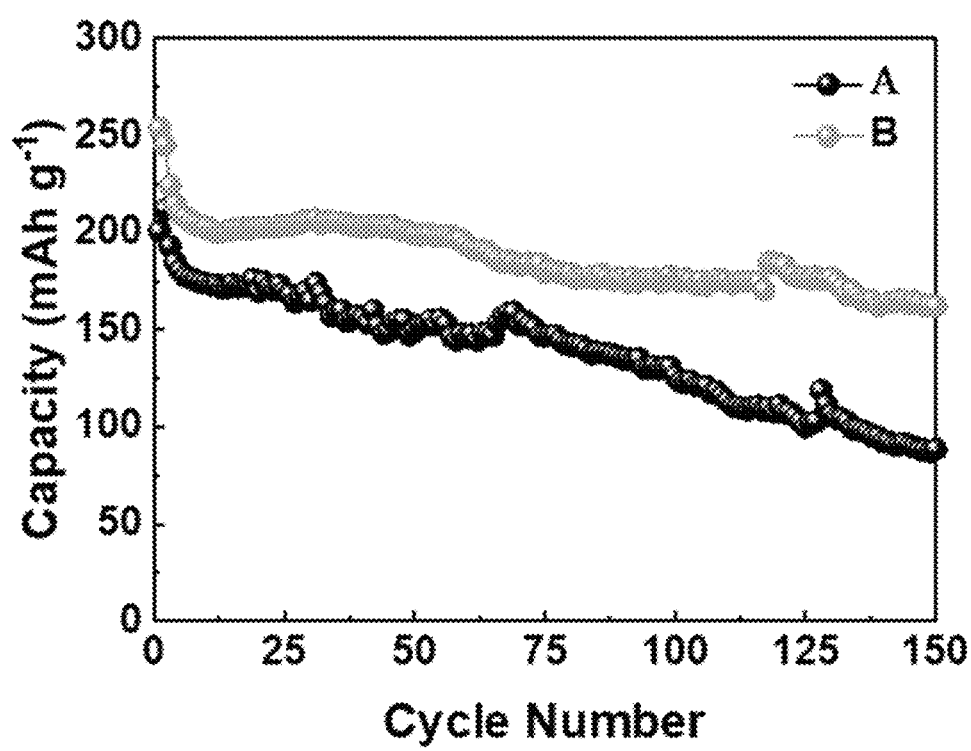
FIG. 9 shows cycle life characteristics of a coin cell A including an electrode produced in Comparative Example 1 and a coin cell B including an electrode produced in Example 1 during 150 charge/discharge cycles.

Referring to FIG. 9, the coin cell (A: δ-MnO$_2$) including the electrode of Comparative Example 1 showed a discharge capacity retention corresponding to 44.0% of the initial discharge capacity after 150 cycles and the coin cell including the electrode of Example 1 (B: [Pd/C]-[δ-MnO$_2$]) showed a discharge capacity retention corresponding to 63.8% of the initial discharge capacity after 150 cycles.

These results indicate that the inventive palladium-manganese oxide composite catalyst ([Pd/C]-[δ-MnO$_2$]) regenerates hydrogen to water to minimize the effects of side reactions and protect the electrodes during charging/discharging, suggesting that it can provide a solution to the problems (including hydrogen generation and electrode damage) encountered in existing aqueous rechargeable batteries.

In summary, the use of the noble metal-manganese oxide composite catalyst according to the present invention in a positive electrode for an aqueous rechargeable battery can reduce the amount of gases generated by driving of the battery to ~1/10 compared to the single use of the manganese oxide catalyst of Comparative Example 1. In addition, the aqueous rechargeable battery of the present invention using the noble metal-manganese oxide composite catalyst exhibits significantly improved stability, charge capacity, and life characteristics.

These results show that the noble metal-manganese oxide composite catalyst of the present invention is essential to achieve high performance of aqueous rechargeable batteries.

INDUSTRIAL APPLICABILITY

The noble metal-manganese oxide composite catalyst of the present invention can regenerate decomposition products of an electrolyte back to water. Due to this ability, the noble metal-manganese oxide composite catalyst of the present invention can prevent the performance of the battery from deteriorating and the internal pressure of the battery from rising caused by electrolyte decomposition, which is one of the most major problems of commercial aqueous rechargeable battery systems. When applied to an electrode, the noble metal-manganese oxide composite catalyst of the present invention regenerates decomposition products of a solvent back to water through a series of processes. The decomposition products may be formed by various causes. In addition, the noble metal-manganese oxide composite catalyst of the present invention returns to its original state during charging of the battery. Therefore, the noble metal-manganese oxide composite catalyst of the present invention can continuously exert its functions without being consumed during driving of the battery.

According to the prior art, metal electrodes of aqueous rechargeable batteries are protected from corrosion by using expensive alloy electrodes or utilizing organic-inorganic electrolyte additives. However, it is impossible to fundamentally prevent electrolyte decomposition thermodynamically.

Unlike the prior art, the present invention proposes an approach to regenerate decomposition products of an electrolyte. It is thought that this approach offers the potential to replace the prior art and can find application in various aqueous rechargeable batteries such as currently commercially available aqueous zinc rechargeable batteries.

Although the present invention has been described herein with reference to its preferred embodiments, various variations and modifications can be made thereto without departing from the spirit and scope of the present invention. Such variations and modifications are intended to come within the scope of the appended claims.

What is claimed is:

1. A noble metal-manganese oxide composite catalyst for a positive electrode of an aqueous rechargeable battery,
   wherein a weight ratio of the manganese oxide to the noble metal is 100:0.001-10, and
   wherein the composite catalyst functions to convert decomposition products, including hydrogen gas, back into water as a solvent of an aqueous electrolyte in the aqueous rechargeable battery.

2. The noble metal-manganese oxide composite catalyst according to claim 1, wherein the weight ratio of the manganese oxide to the noble metal is 100:0.01-0.8.

3. The noble metal-manganese oxide composite catalyst according to claim 1, wherein the noble metal is in a form of nanoparticles and is evenly mixed with the manganese oxide particles.

4. The noble metal-manganese oxide composite catalyst according to claim 3, wherein the noble metal particles are supported on a carbon-based support.

5. The noble metal-manganese oxide composite catalyst according to claim 4, wherein the carbon support is selected from carbon black, activated carbon, carbon nanotubes, carbon fibers, fullerenes, graphene, and mixtures thereof.

6. The noble metal-manganese oxide composite catalyst according to claim 1, wherein the noble metal is palladium (Pd).

7. The noble metal-manganese oxide composite catalyst according to claim 1, wherein the manganese oxide is represented by $MnO_x$ ($1 \leq x \leq 4$).

8. The noble metal-manganese oxide composite catalyst according to claim 1, wherein the manganese oxide is selected from $MnO_2$, $Mn_2O_3$, $Mn_3O_4$, MnOOH, and mixtures thereof.

* * * * *